(12) United States Patent
Wenger (10) Patent No.: US 12,442,162 B2
(45) Date of Patent: Oct. 14, 2025

(54) HYDRANT VALVE SYSTEM, AND HYDRANT HAVING SUCH A SYSTEM

(71) Applicant: VONROLL INFRATEC (INVESTMENT) AG, Emmenbrucke (CH)

(72) Inventor: Sascha Wenger, Oensingen (CH)

(73) Assignee: VONROLL INFRATEC (INVESTMENT) AG, Emmenbrucke (SE)

( * ) Notice: Subject to any disclaimer, the term of this patent is extended or adjusted under 35 U.S.C. 154(b) by 0 days.

(21) Appl. No.: 18/269,608

(22) PCT Filed: Dec. 22, 2021

(86) PCT No.: PCT/EP2021/087418
§ 371 (c)(1),
(2) Date: Jun. 26, 2023

(87) PCT Pub. No.: WO2022/144287
PCT Pub. Date: Jul. 7, 2022

(65) Prior Publication Data
US 2024/0060279 A1    Feb. 22, 2024

(30) Foreign Application Priority Data
Dec. 29, 2020    (EP) .................................... 20217662

(51) Int. Cl.
*E03B 9/02*    (2006.01)
(52) U.S. Cl.
CPC .................................... *E03B 9/02* (2013.01)

(58) Field of Classification Search
CPC . E03B 9/02; E03B 9/08; F16K 27/006; Y10T 137/5491
See application file for complete search history.

(56) References Cited

U.S. PATENT DOCUMENTS

| 208,072 | A | * | 9/1878 | Carr | ......................... | E03B 9/14 |
| | | | | | | 137/901 |
| 358,567 | A | * | 3/1887 | Perkins | ..................... | E03B 9/14 |
| | | | | | | 137/285 |
| 7,156,119 | B2 | * | 1/2007 | Freudendahl | ......... | F16K 15/026 |
| | | | | | | 137/71 |

(Continued)

FOREIGN PATENT DOCUMENTS

| DE | | 2508792 A1 | * | 9/1975 |
| DE | | 3031520 A1 | * | 3/1982 |

(Continued)

OTHER PUBLICATIONS

International Search Report with Translation and Written Opinion for PCT application No. PCT/EP2021/087418, mailed Mar. 18, 2022.
International Application Status Report generated Jun. 6, 2023.

*Primary Examiner* — Jessica Cahill
(74) *Attorney, Agent, or Firm* — Notaro, Michalos & Zaccaria P.C.

(57) ABSTRACT

A hydrant valve system having a hydrant main valve with a main valve body and a valve seat where the main valve body can be moved axially in relation to the valve seat, and a housing that defines a clearance volume into which the main valve body can be moved. The hydrant valve system also has a sealing body that is provided in the clearance volume where the sealing body has a higher density than water.

12 Claims, 6 Drawing Sheets

(56) References Cited

U.S. PATENT DOCUMENTS

2003/0150486 A1* 8/2003 Liebert ................ F16K 17/048
　　　　　　　　　　　　　　　　　　　　　　137/68.14
2016/0101307 A1* 4/2016 Montague ................ E03B 9/14
　　　　　　　　　　　　　　　　　　　　　　137/287

FOREIGN PATENT DOCUMENTS

| DE | 4119105 A1 * | 9/1992 | | |
| DE | 20201884 U1 | 6/2003 | | |
| DE | 102015108820 A1 | 12/2016 | | |
| DE | 10052505 A1 * | 5/2022 | ........... | B23K 11/115 |
| EP | 1010824 A1 | 6/2000 | | |

* cited by examiner

HYDRANT VALVE SYSTEM, AND HYDRANT HAVING SUCH A SYSTEM

The present invention relates to a hydrant valve system, a lower part of a hydrant, and a hydrant.

Hydrants are connected to a water distribution system and represent a fitting for the withdrawal of water, thus enabling the fire department as well as public and private users to withdraw water from the water distribution system. The mains pressure in the water distribution system is typically about 6-9 bar. Hydrants comprise a lower part with an interior and an exterior, wherein the water distribution system is typically connected to the interior via a bottom-side water inlet pipe or water inlet. Water is drawn from the interior of the hydrant through side connections.

To open and close hydrants, hydrant main valves or shut-off devices are known, which can be arranged in the area or close to the water inlet. Shut-off devices are, for example, hydrant main valves which comprise an axially displaceable main valve body which can seal with a sealing surface or a sealing seat of the hydrant. Alternatively, the main valve body can seal with a sealing surface of a main valve seat that can be removably inserted into the hydrant, also known as a changeover valve seat.

The main valve body is a sealing element which, in a closed position of the hydrant main valve, seals with the sealing surface of the hydrant. To open the hydrant main valve (open position), the main valve body is moved up or down over the sealing surface. This opens a gap through which the water can flow from the bottom-side water inlet into the interior of the lower part and thus of the hydrant. In this case, the main valve body can be coupled to a valve rod by means of which the main valve body can be adjusted from the closed position to the open position and vice versa. The valve rod can be arranged axially inside the hydrant and can be adjusted manually via an actuating element, e.g. a spindle drive. In this case, an externally applied manual rotation can be converted by means of the actuating element into an axial adjustment via which the valve rod and the main valve body coupled thereto are guided axially up or down.

The lower part can have a housing at its lower end, which defines a clearance volume into which the main valve body can be adjusted. In this embodiment, the hydrant main valve is opened by moving the main valve body downward.

When the hydrant main valve is open, it may happen that the line pressure in the water distribution system is lower than the pressure at the hydrant outlet. One cause of this may be a pressure drop in the water distribution system. Another cause may be an unintentional or intentional push-back or backflow of contaminated liquids, namely liquids in the hydrant or outside the hydrant, e.g. liquids in a connected hose, in a fire-fighting vehicle, etc., but also liquids which are unintentionally or intentionally pushed or flushed into the hydrant. Since the hydrant main valve may be open, liquid from outside may enter the water distribution system, Thus, a problem in the prior art is that the water in the water distribution system can become contaminated.

The object of the present invention is to provide a hydrant valve system, a lower part of a hydrant, and a hydrant which do not have the above disadvantage.

This object is solved by a hydrant valve system having the features given in claim 1. Advantageous embodiment variants as well as a lower part and a hydrant are given in further claims.

The hydrant valve system according to the invention comprises a hydrant main valve having a main valve body and a valve seat, wherein the main valve body is axially adjustable in relation to the valve seat, and a housing defining a clearance volume into which the main valve body is adjustable. Further, the hydrant valve System comprises a sealing body provided in the clearance volume, wherein the sealing body has a higher density than water.

The invention provides a sealing body which is arranged in a clearance volume defined by a housing, wherein said sealing body has a higher density than water, Thus, in the event of a pressure drop in the water distribution system, as a result of which the line pressure is lower than the pressure at the hydrant outlet and at the same time the hydrant main valve is open, the sealing body will sink in the liquid medium in the clearance volume and close off or block access to the water distribution system. Thus, no possibly contaminated liquids or foreign substances can enter the water distribution system from outside.

In the closed state (closed position) of the hydrant main valve, the sealing body blocks access to the water distribution system. If liquid still remains in the clearance volume, the sealing body will also sink here in the liquid medium in the clearance volume and block access to the water distribution system (sealing position).

In the open state of the main valve, however, the sealing body is lifted from the aforementioned sealing position by the inflowing water. In this case, the sealing body strikes against the main valve body, which is adjusted downward. This advantageously prevents the sealing body from sealing against the top, so that the water flow continues to be reliably ensured.

As previously described, the circumstance may occur that the line pressure in the water distribution system is lower than the pressure at the hydrant outlet, while at the same time the main valve is open. This circumstance may occur, for example, due to a pressure drop in the water distribution system, intentional or unintentional backpressure or backflow of possibly contaminated fluids, etc. Under this circumstance, the sealing body advantageously sinks even in the liquid medium and reliably inhibits or blocks an inlet opening of the hydrant valve system. This advantageously prevents the introduction of foreign substances, contaminated liquids, etc. into the water distribution system.

Furthermore, in the event of e.g. an overhaul of the hydrant, as a result of which the main valve body is pulled out upwards beyond the sealing seat, the water flowing in via the water distribution system washes or presses the sealing body upwards into sealing contact against a section below the sealing seat (also referred to as the outlet opening). The sealing body is in sealing contact due to the upward water pressure, which advantageously shuts off the water inflow into the down tube. The linkage including the main valve body can now be removed from the hydrant and serviced. To avoid high pressure surges, the removal should not be carried out too quickly.

In an advantageous embodiment of the hydrant valve system, the sealing body has a density of more than 997 kg/m3. The sealing body has a higher density than water, which causes it to sink in the liquid medium. Thus, the water inlet can advantageously be sealed by the sealing body even in the liquid medium.

In an advantageous embodiment of the hydrant valve system, the sealing body contains a rubber material. The material of the sealing body can be selected to provide an excellent seal against the aforementioned inlet opening and/or the outlet opening defined above the clearance volume. The sealing body may be formed entirely of rubber material. In one example, the sealing body may be provided with rubber material only on its surface. In another example, the sealing body may comprise polyoxymethylene (POM).

In an advantageous embodiment of the hydrant valve system, the sealing body is a ball. The sealing body in the form of a ball can reliably seal the inlet opening and/or outlet opening. Sections in the area of the inlet opening and outlet opening can be shaped to correspond to corresponding surface sections of the ball in order to achieve a large-area seal.

In an advantageous embodiment, the hydrant valve system further comprises a plurality of sealing body guides which are provided in the clearance volume, wherein the sealing body guides are designed for substantially vertical guiding of the sealing body. For example, four sealing body guides can be provided on the inner wall of the clearance volume at a uniform angular distance from each other, which are dimensioned in such a way that the inserted sealing body can only be adjusted vertically. In this way, it can be ensured that the sealing body reliably comes into contact with sections in the area of the inlet opening and/or outlet opening and also reliably abuts against the underside of the main valve body as soon as the hydrant main valve is opened.

In an advantageous embodiment of the hydrant valve system, the sealing body guides are formed integrally with the housing. This design facilitates production and saves costs.

In an advantageous embodiment of the hydrant valve system, the housing has an inlet opening, wherein the inner diameter of the housing at the inlet opening is smaller than the diameter of the sealing body. Further advantageously, the inner surface of the housing at the inlet opening may be provided with a sealing surface.

Further advantageously, the sealing surface at the inlet opening can be shaped to correspond to corresponding surface sections of the sealing body.

In another advantageous embodiment of the hydrant valve system, the housing has an outlet opening, wherein the inner diameter of the housing at the outlet opening is smaller than the diameter of the sealing body. In a further advantageous embodiment, the inner surface of the housing at the outlet opening is provided with a sealing surface. Further advantageously, the sealing surface at the outlet opening is shaped to correspond to corresponding surface sections of the sealing body.

The inlet opening may be adjacent to the bottom-side water inlet, while the outlet opening may be located in the area of the hydrant main valve. The clearance volume housing may expand outwardly with increasing distance from both the inlet opening and the outlet opening. In other words, the housing may be approximately spherical or bulbous in shape.

The diameter of the inlet opening may be equal to or larger than the diameter of the ball, thus allowing the ball to enter the clearance volume. The ball can come into contact with a sealing surface formed in the water inlet section. Alternatively, a seal may be provided which is interposed between the water inlet and down pipe of the hydrant. The seal can have a correspondingly shaped sealing surface with which the ball can come into sealing contact. Thus, the ball can sealingly abut the water inlet or the inlet opening (bottom) as soon as the hydrant main valve is closed. In addition, the ball can be in sealing contact with the inlet opening if the main valve is open and at the same time the line pressure is lower than the pressure at the hydrant outlet, e.g. due to a pressure drop in the water distribution system. This can prevent foreign matter from entering the water distribution system.

The sealing body can also be in sealing contact with the outlet opening (top), e.g. in case of overhaul, repair or maintenance of the hydrant under mains pressure. In the event of an overhaul, for example, the main valve body can be pushed out upwards past the valve seat. As soon as the main valve body has passed the valve seat or the seat section, a water flow starts from the bottom to the top. This washes the sealing body in an upward direction until it shuts off below the valve seat or at the outlet opening. Since the ball has a larger diameter than the outlet opening in the area of the valve seat, the ball seals the water inflow into the hydrant. As soon as it is pressed upwards by inflowing water, the sealing body can seal itself, for example, against the correspondingly shaped sealing surface in the upper area of the clearance volume. The valve rod incl. main valve body can now be removed from the hydrant and serviced outside the hydrant.

In an advantageous embodiment of the hydrant valve system, the housing is formed in one piece with a lower part of a hydrant. In this embodiment, the hydrant valve system can be advantageously integrated into the lower part. In an advantageous embodiment of the hydrant valve system, the valve seat is a changeover valve seat.

The invention further relates to a lower part of a hydrant. The lower part comprises a hydrant main valve comprising a main valve body and a valve seat, wherein the main valve body is axially adjustable relative to the valve seat. The lower part, further comprises a housing defining a clearance volume into which the main valve body is adjustable. Furthermore, the lower part comprises a sealing body provided in the clearance volume, with the sealing body having a higher density than water. The invention further relates to a hydrant comprising a lower part.

It is expressly pointed out that the above embodiment variants can be combined in any way, Only those combinations of embodiment variants are excluded which would lead to contradictions due to the combination.

In the following, the present invention is further explained with reference to exemplary embodiments shown in the drawing, wherein.

FIGS. 1-6 each show a sectional view of a lower part 10 of a hydrant in the section of a bottom end of the lower part 10. The views provide a view of a hydrant valve system 12 of the lower part 10 and show the hydrant valve system 12 in various positions or operations.

Figure 1:
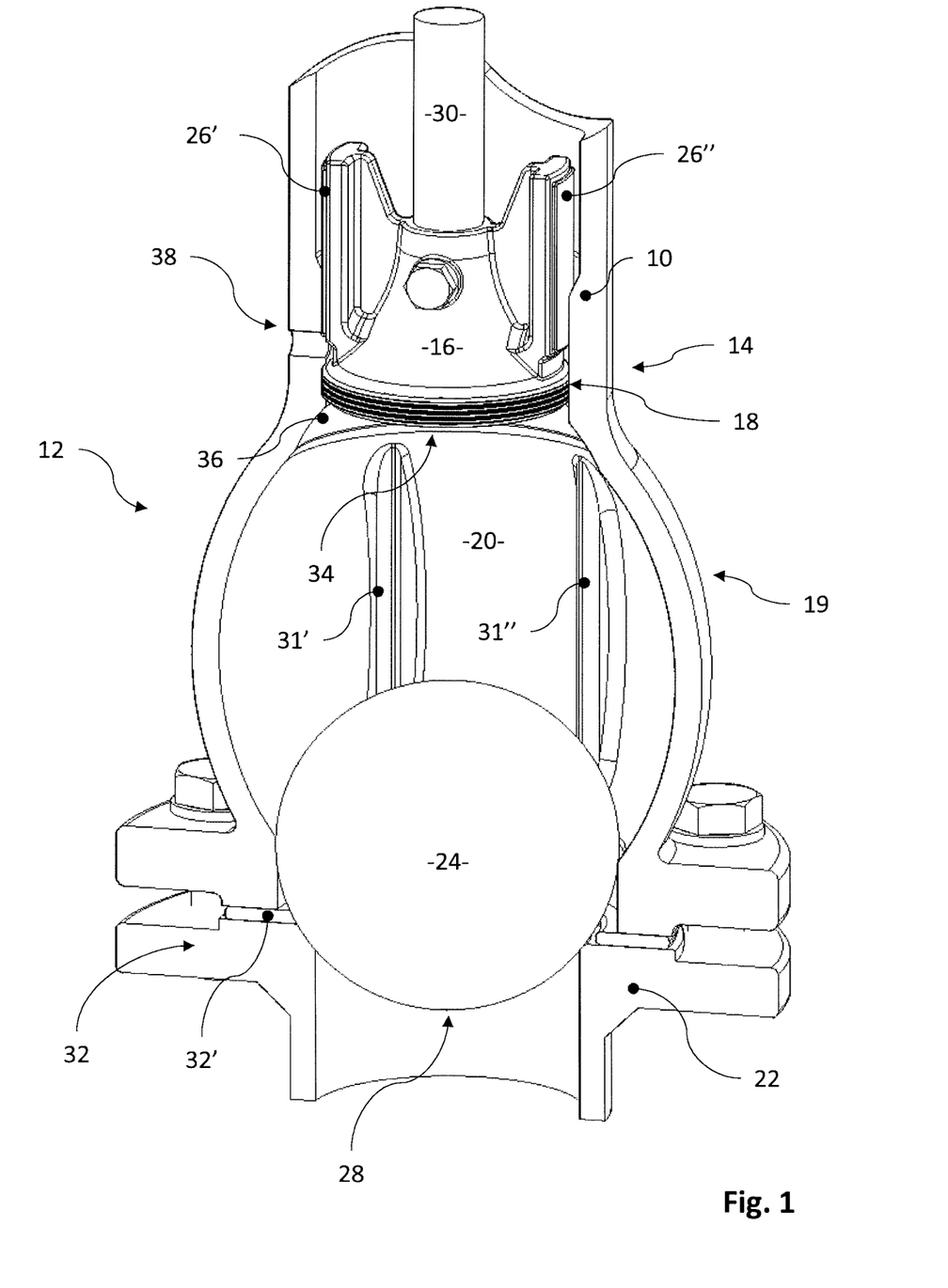
FIG. 1 shows a sectional view of a lower part of a hydrant with a first sealing insert to show a hydrant valve system in a closed position.
Figure 5:
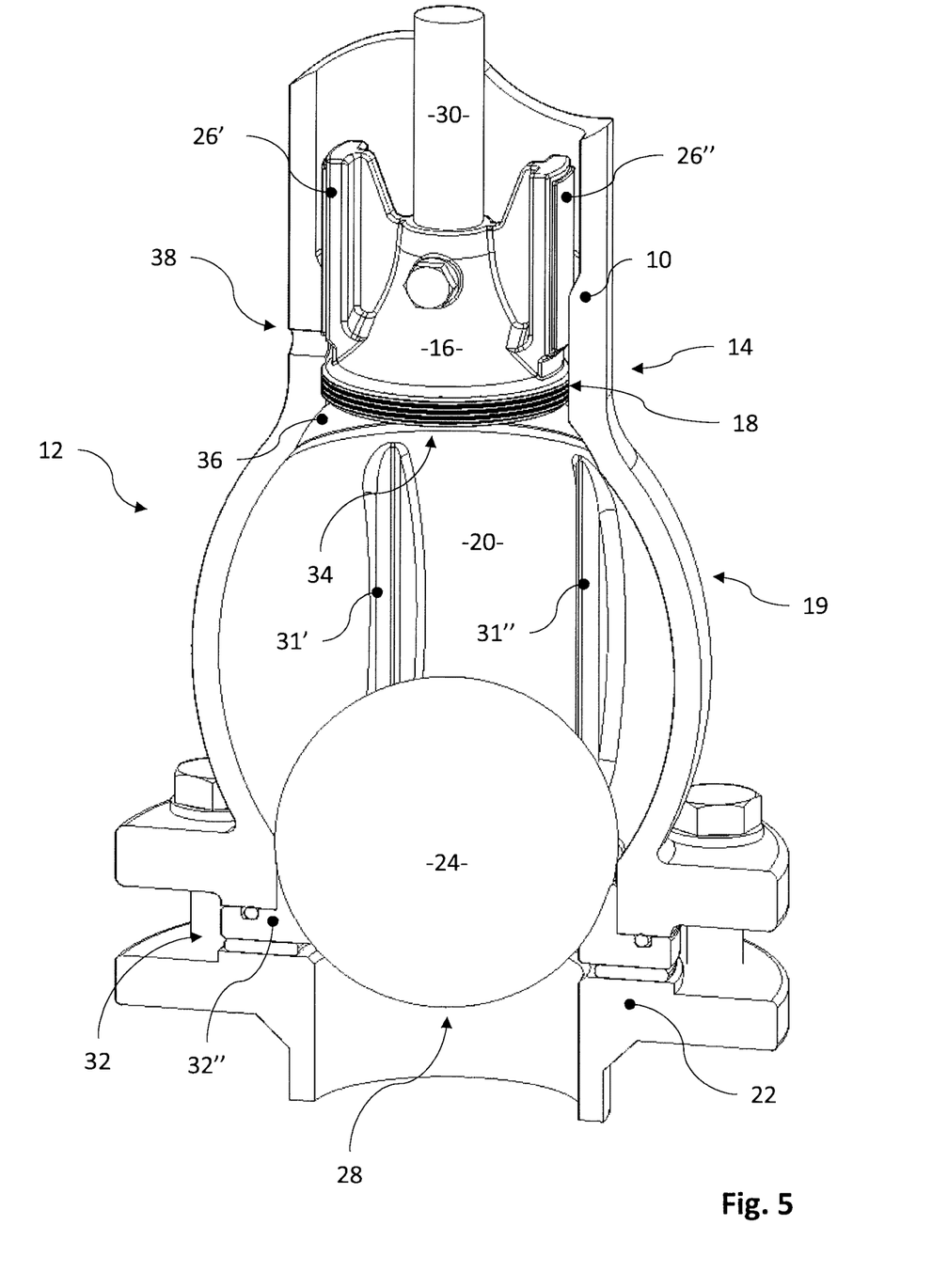
FIG. 5 shows a sectional view of a lower part of a hydrant as in FIG. 1 with a second sealing insert.

The hydrant valve system 12 comprises a hydrant main valve 14, which comprises a main valve body 16 and a corresponding valve seat 18 or sealing surface with which the main valve body 16 can be brought into sealing engagement, as shown in FIGS. 1 and 5. Here, the main valve body 16 is axially adjustable in relation to the valve seat 18. Furthermore, the hydrant valve system 12 includes a clearance volume 20 defined by a housing 19 into which the main valve body 16 is adjustable to open the hydrant main valve 14. The clearance volume 20 may be defined as a space provided substantial y between the hydrant main valve 14 and a bottom-side water inlet 22 connected to a water distribution system (not shown). The clearance volume 20 is again provided with a sealing body 24, explained in more detail below, which in the example shown is in the form of a ball or sealing sphere. As shown in the figures, the housing 19 may be formed integrally with the lower part 10.

Figure 2:
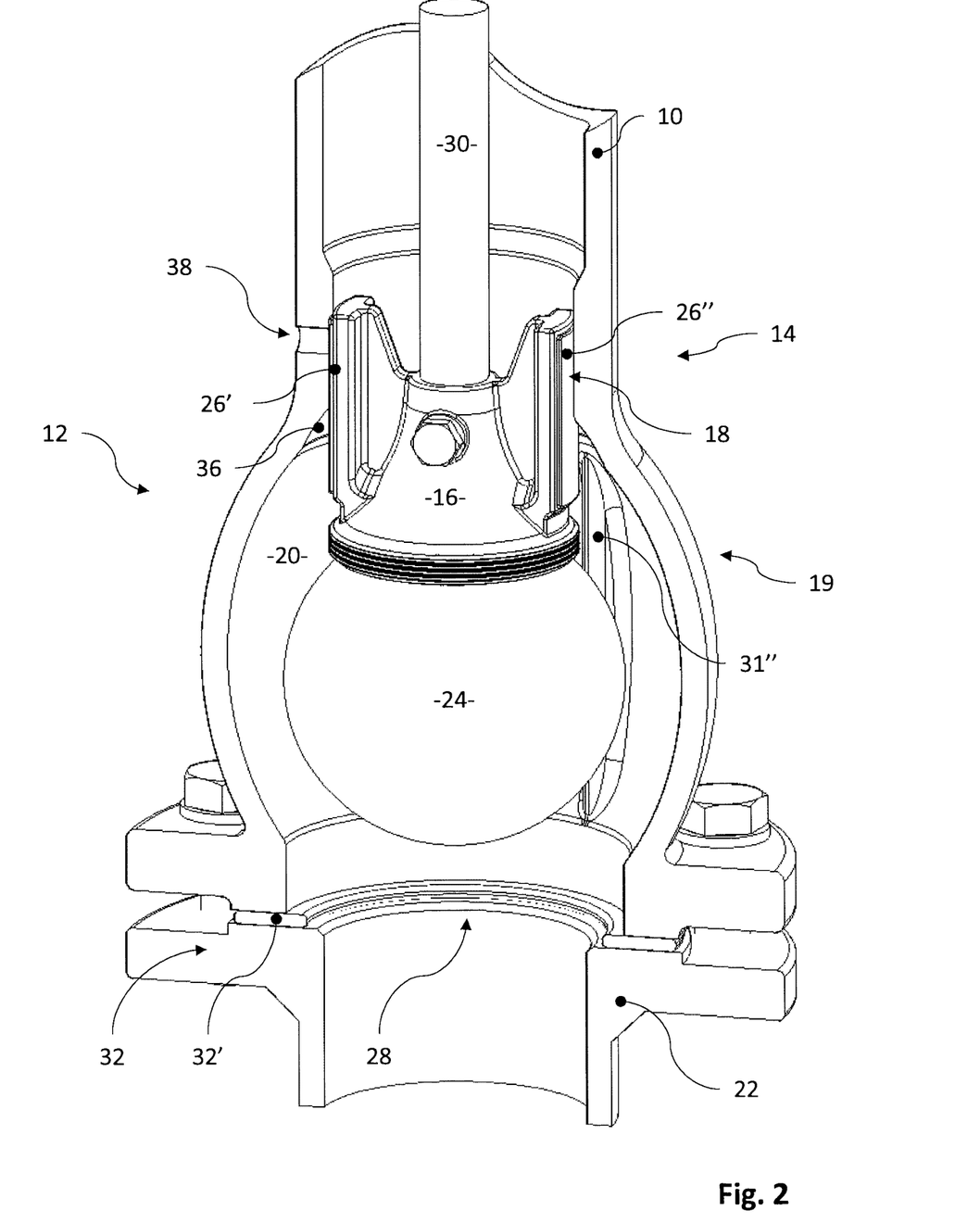
FIG. 2 shows a sectional view of a lower part of a hydrant with a first sealing insert to show a hydrant valve system in an open position.
Figure 6:
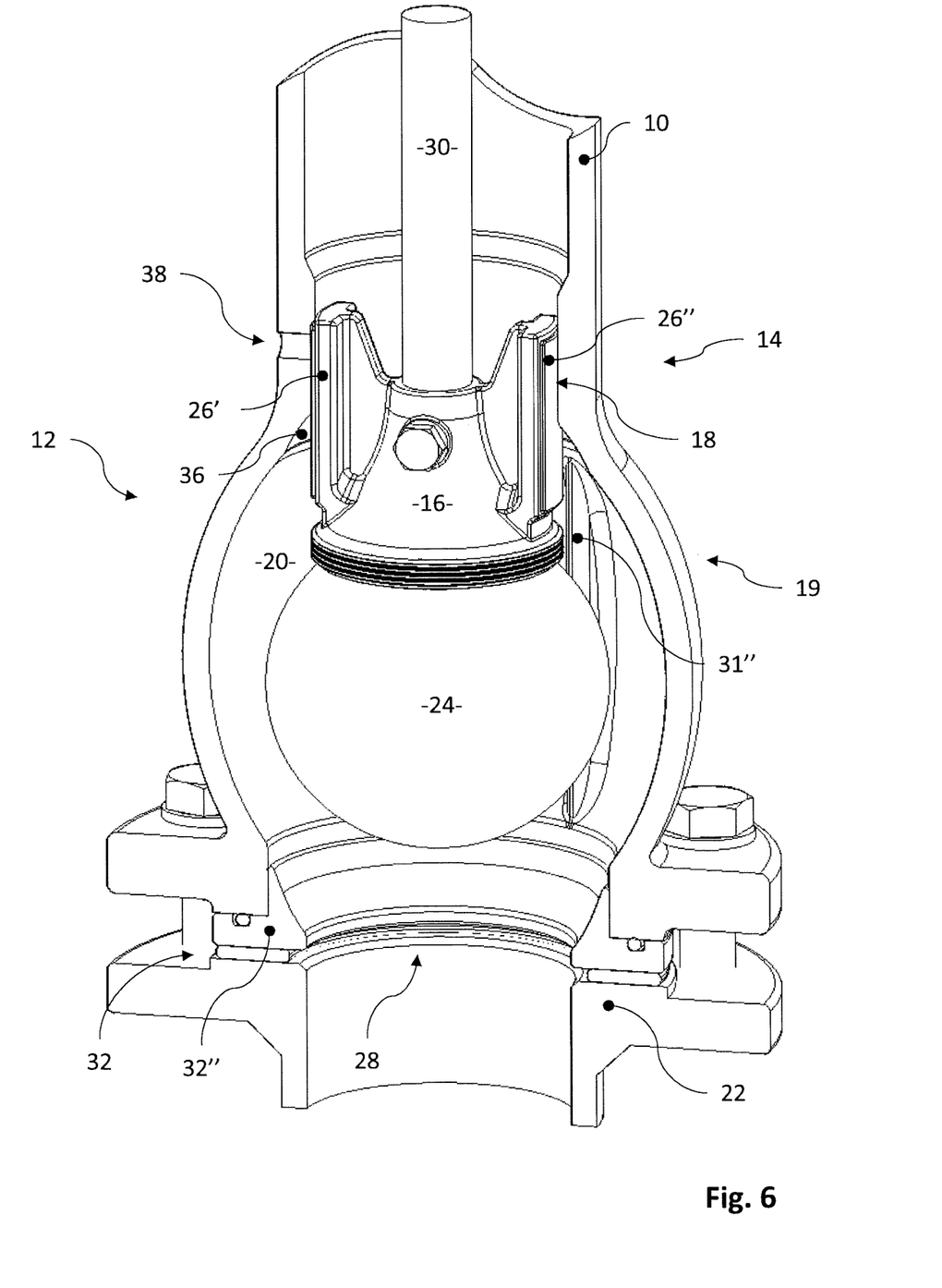
FIG. 6 shows a sectional view of a lower part of a hydrant similar to FIG. 2 with a second sealing insert.

The main valve body 16 is a sealing element that seals with the valve seat 18 in a closed position of the hydrant main valve 14. To open the hydrant main valve 14, the main valve body 16 is moved downward as shown in FIGS. 2 and 6. The main valve body 16 is provided with wings 26',26" which guide its displacement axially by sliding along from an inner surface section of the lower part 10 and along the valve seat 18, respectively. When the hydrant main valve 14 is opened, a substantially annuler gap opens. Water flows through this gap from the bottom-side water inlet 22, through an inlet opening 28 of the lower part. 10, through the clearance volume 20 and finally upwardly into the interior of the hydrant, in order to then be withdrawn from the outside.

The main valve body 16 is coupled to a valve rod 30, via which the main valve body 16 is vertically displaceable, e.g. from the closed position to the open position and vice versa. The valve rod 30 extends within the hydrant in the axial direction and can be adjusted, for example, by converting a manually applied torque into an axial adjustment by means of, for example, a spindle drive (not shown). This moves the valve rod 30 and the main valve body 16 connected thereto axially up or down.

As previously mentioned, the sealing body 24 is provided in the clearance volume 20 of the hydrant valve system 12. According to the invention, the sealing body 24 has a higher density than water. Provided that the hydrant main valve 14 is shut off, the sealing body 24 seals the inlet opening 28. In the event of water or residual water in the clearance volume 20, the sealing body 24 sinks therein and seats the inlet opening 28.

Sealing body guides 31, 31" can be provided on the inner wall of the housing 19, which project into the clearance volume 20 in a substantially radially inward direction. These sealing body guides 31', 31" are dimensioned and arranged relative to one another in such a way that they can reliably guide the sealing body 24 in a merely vertical direction. Although only two sealing body guides 31',31" are shown in the figures for illustrative reasons, four sealing body guides can, for example, be provided on the inner wall of the housing 19 with, for example, uniform angular spacing from one another, which are dimensioned in such a way that the inserted sealing body 24 can only be adjusted vertically. Thus, it can be ensured that the sealing body 24, among other things, reliably abuts against the underside of the main valve body 16 as soon as the hydrant main valve 14 is opened. The sealing body guides 31', 31" are preferably formed integrally with the housing 19 or the lower part 10. This can save manufacturing costs.

The lower part 10 may comprise, in the section of the inlet opening 28, an Inlet opening seal 32 in the design of a first sealing insert 32', e.g. a sealing ring (see FIGS. 1 to 4), or in the design of a second sealing insert 32", e.g. a sealing cone (see FIGS. 5 and 6). The sealing inserts 32', 32" are arranged between the water inlet 22 and the underside of the lower part 10 and may, for example, be shaped to substantially correspond to corresponding surface sections of the (seated) sealing body 24. This increases the sealing surface. The material of the sealing inserts 32',32" may be a rubber material. The diameter of the inlet opening 28 is equal to or larger than the diameter of the sealing body 24, while the diameter of the water inlet 22 is smaller than the diameter of the sealing body 24.

For example, the sealing body 24 may include a rubber material. Thus, the inlet opening 28 is reliably sealed by the rubber material of the seated sealing body 24. An advantage is that no residual water can enter the water distribution system.

Once the hydrant main valve 14 is opened, the clearance volume 20 is subjected to a pressure substantially equal to atmospheric pressure. As the applied line pressure in the water distribution system is higher, the water flows into the clearance volume 20 and the incoming water pushes the sealing body 24 upward, as shown in FIGS. 2 and 6. The sealing body 24 thereby comes into contact against the underside of the main valve body 16, which underside of the main valve body 16 may be shaped to correspond to the corresponding surface section of the sealing body 24. The incoming water flows around the sealing body 24 in the clearance volume 20, or along the exposed surface section thereof, and then flows into the hydrant through the open hydrant main valve 14. The sealing body 24 is reliably forced or swept against the underside of the main valve body 16 throughout.

As soon as the hydrant main valve 14 is closed again, the water flow is shut off, resulting in the sealing body 24 falling down due to gravity. Due to its higher density than water, e.g. in this case water remaining in the clearance volume 20, the sealing body 24 sinks reliably even in the liquid medium and arrives in reliable contact with the inlet opening seal 32 of the inlet opening 28 and seals it.

Figure 3:
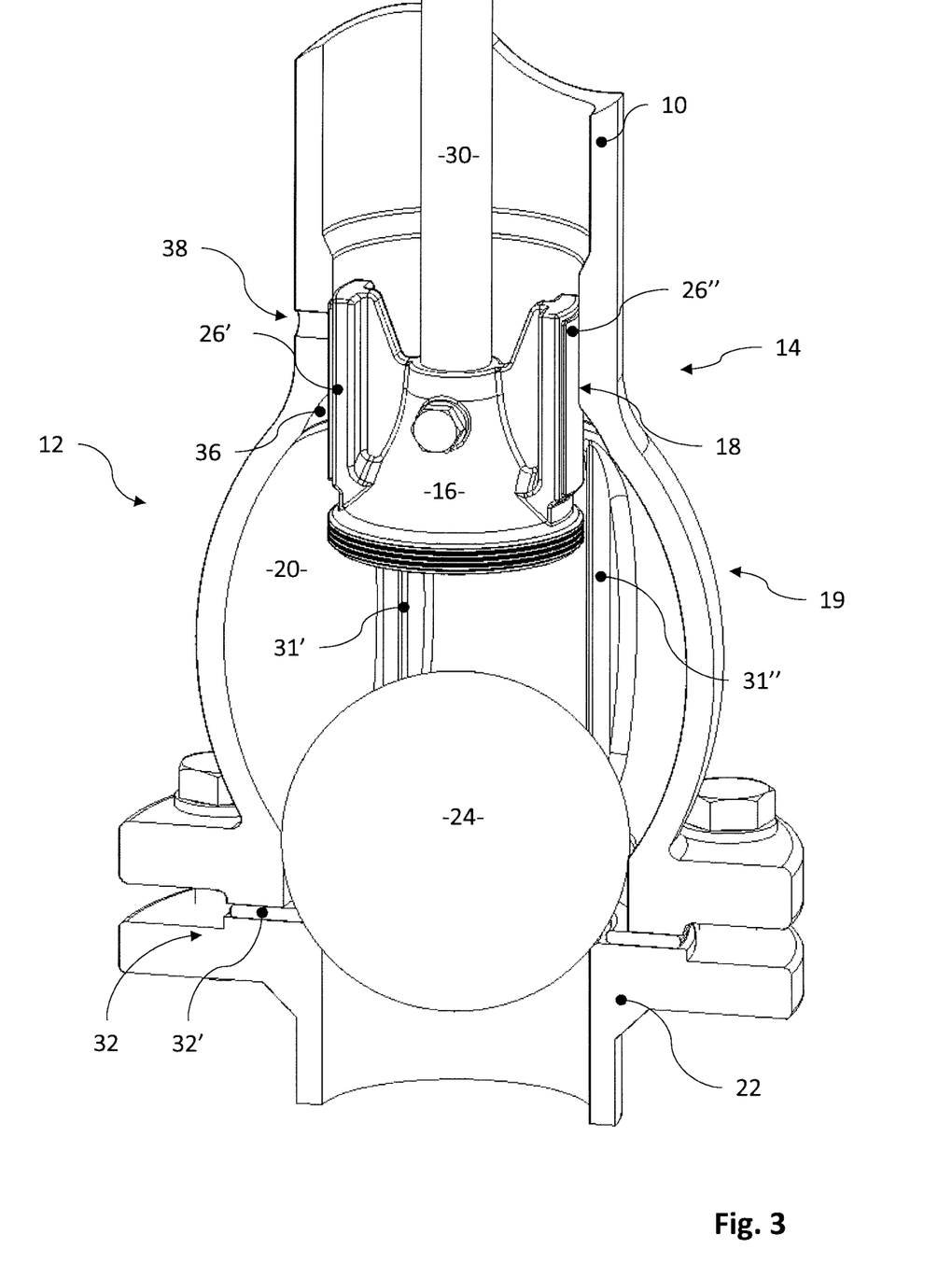
FIG. 3 shows a sectional view of a lower part of a hydrant with a first sealing insert to show a hydrant valve system in an open position during e.g. a pressure drop in the water distribution system.

FIG. 3 shows a sectional view of the lower part. 10 to illustrate the hydrant valve System 12 in a state in which the hydrant main valve 14 is open and at the same time the line pressure in the water distribution system is lower than the pressure at the hydrant outlet. This condition may occur, for example, when the hydrant main valve 14 is open and at the same time there is a pressure drop in the water distribution system. This condition can also occur, for example, if the hydrant main valve 14 is open and liquids, e.g. a possibly contaminated liquid, enter or are forced Into the hydrant from outside.

In the case described, the sealing body 24 sinks due to its higher density than water in the liquid medium and reliably sits on the inlet opening sealing surface 32, thereby blocking the inlet opening 28 or the water inlet 22 laid on the bottom side. This reliably prevents accidental or possibly intentional contamination of the water in the water distribution system.

Figure 4:
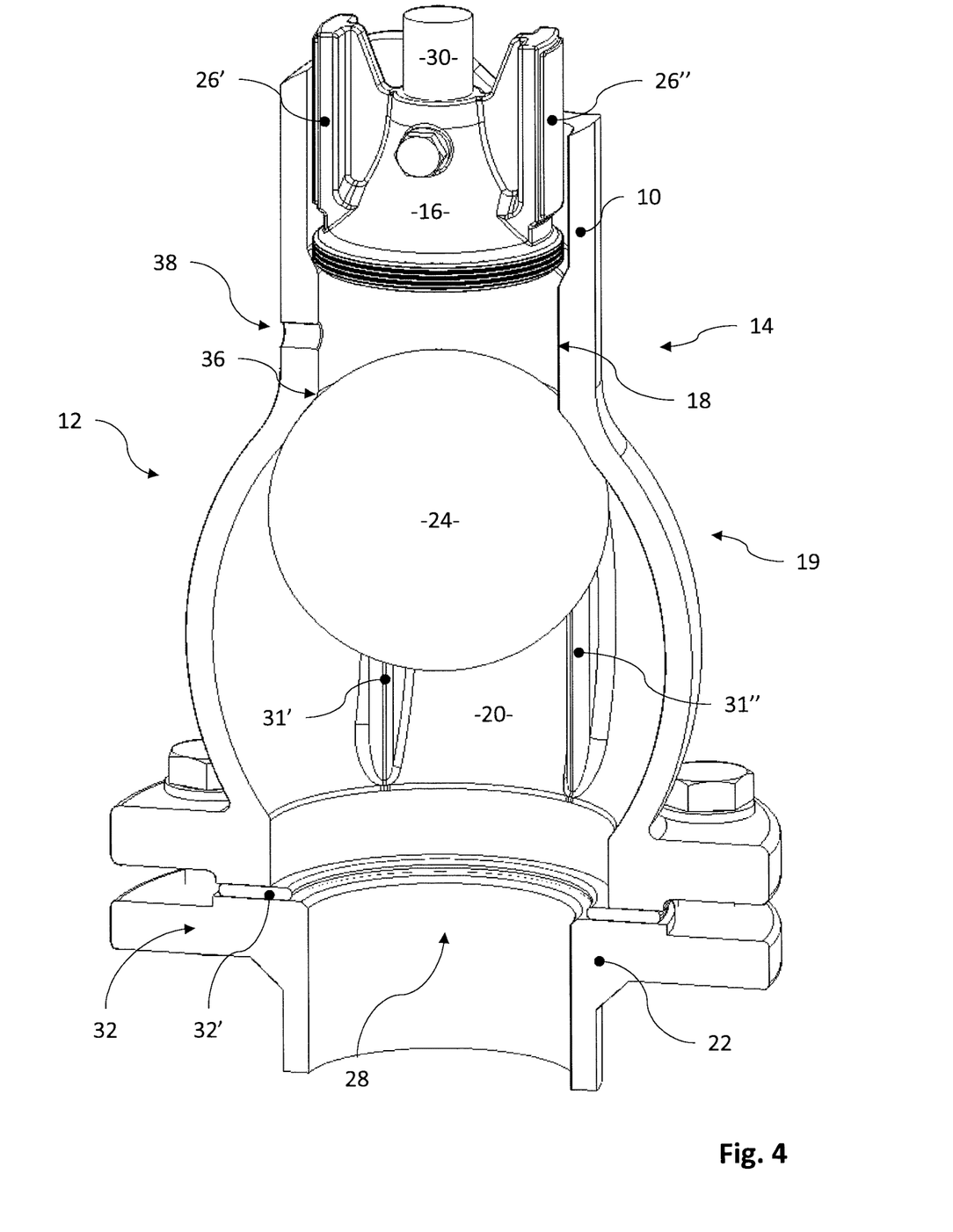
FIG. 4 shows a sectional view of a lower part of a hydrant with a first sealing insert to show a hydrant valve system during e.g. an overhaul.

FIG. 4 shows a sectional view of the lower part 10 to illustrate the hydrant valve System 12 during, for example, an overhaul. An overhaul may necessitate the complete or partial removal of the valve rod 30 together with the main valve body 16, also referred to as the linkage, in order, for example, to subject the main valve body 16 to an overhaul or to be able to carry out maintenance and/or overhaul on other components of the hydrant. In this case, the main valve body 16 is adjusted upward until it is no longer in sealing engagement with the valve seat 18. In this condition, water from the water distribution system flows into the clearance volume 20 and pushes or washes the sealing body 24 upwardly toward an outlet opening 34 against which the sealing body 24 abuts. The outlet opening 34 may have an outlet opening sealing surface 36 shaped to correspond to corresponding surface sections of the pressed-on sealing body 24. The sealing body 24 is pressed firmly against the outlet opening sealing surface 36 for the entire duration of the overhaul. No water penetrates into the hydrant during this process. Thus, the overhaul work can advantageously be carried out reliably even under line pressure. The water distribution system does not have to be interrupted to any great extent beforehand. Further advantageously, no solid and/or liquid substances can penetrate the water distribution system even in this state. Any solid and/or liquid substances that may have been introduced into the hydrant from the outside can be drained off into the ground via a drainage opening 38.

The invention claimed is:

1. A hydrant valve system (12), comprising:
   a hydrant main valve (14) having a main valve body (16) and a valve seat (18), wherein the main valve body (16) is axially adjustable in relation to the valve seat (18),
   a housing (19) defining a clearance volume (20) into which the main valve body (16) is adjustable, and
   a sealing body (24) provided in the clearance volume (20), wherein the sealing body (24) has a higher density than water,
   wherein the housing (19) has an inlet opening (28) adapted to be mounted onto a bottom-side water inlet (22) having a smaller inner diameter than the inner diameter of the housing (19) at the inlet opening (28),
   wherein the inner diameter of the housing (19) at the inlet opening (28) is larger than the diameter of the sealing body (24) and wherein the inner diameter of the bottom-side water inlet (22) is smaller than the diameter of the sealing body (24),
   wherein the sealing body (24) comprises a rubber material at least at an outer surface of the sealing body (24),
   wherein an inner surface of the bottom-side water inlet (22) forms a sealing surface, and
   wherein a watertight seal is formed when the sealing body (24) is arranged against the sealing surface.

2. The hydrant valve system (12) according to claim 1, wherein the sealing body (24) has a density greater than 997 kg/m3.

3. The hydrant valve system (12) according to claim 1, wherein the sealing body (24) is a ball.

4. The hydrant valve system (12) according to claim 1, further comprising a plurality of sealing body guides (31', 31") which are provided in the clearance volume (20), adapted to guide the sealing body (24) substantially vertically.

5. The hydrant valve system (12) according to claim 4, wherein the sealing body guides (31',31") are integrally formed with the housing (19).

6. The hydrant valve system (12) according to claim 1, wherein the sealing surface at the bottom-side water inlet (22) is shaped to correspond to corresponding surface sections of the sealing body (24).

7. The hydrant valve system (12) according to claim 1, wherein the housing (19) has an outlet opening (34), wherein the inner diameter of the housing (19) at the outlet opening (34) is smaller than the diameter of the sealing body (24).

8. The hydrant valve system (12) according to claim 7, wherein the inner surface of the housing (19) is provided with a sealing surface (36) at the outlet opening (34).

9. The hydrant valve system (12) according to claim 8, wherein the sealing surface (36) at the outlet opening (34) is shaped to correspond to corresponding surface sections of the sealing body (24).

10. The hydrant valve system (12) according to claim 1, wherein the housing (19) is integrally formed with a lower part (10) of a hydrant.

11. The hydrant valve system (12) according to claim 1, wherein the valve seat (18) is a changeover valve seat.

12. A hydrant, comprising the hydrant valve system (12) according to claim 1.

* * * * *